Patented Nov. 10, 1936

2,060,056

UNITED STATES PATENT OFFICE 2,060,056

NEW CELLULOSE GLYCOLLIC ACID AND PROCESS FOR PREPARING SAME

Deane C. Ellsworth, deceased, late of Wilmington, Del., by Joseph F. Haskins, administrator, Wilmington, Del., assignor to E. I. du Pont de Nemours & Company, Wilmington, Del., a corporation of Delaware No Drawing. Application July 25, 1933, Serial No. 682,119

16 Claims. (Cl. 260—152)

This invention relates to new cellulose derivatives and methods for making them. It relates more particularly to cellulose glycollic acid and especially those cellulose glycolic acids in which the degree of substitution is sufficiently low so that the ethers are of limited solubility in caustic soda solution at room temperature and are relatively soluble in caustic soda solution at low temperatures.

Several modifications of cellulose glycollic acid are known in the prior art. These may be put into three groups:

(a) Ethers soluble in organic solvents.
(b) Ethers soluble in water, or whose sodium salt is soluble in water.
(c) Ethers soluble in excess alkali over the amount required to stoichiometrically combine with the carboxyl groups of the ether.

These differ primarily in the amount of substitution that each represents, (a) being quite high, (b) much less and (c) still less in glycollic radical content. However, between each two classes there is a considerable zone wherein an ether of a given degree of substitution may be found in either class, depending upon the treatment the cellulose has received either before, during, or after the etherification, i. e., depending upon the degradation of the cellulose molecule. Thus the second important factor in determining solubility of cellulose glycollic acid, and of cellulose compounds generally, in any given solvent—as, let us say, 6% NaOH solution—is the state of degradation (depolymerization) of the cellulose ether. This second factor is even more important in affecting the usefulness of the cellulose derivative. It is to be understood, however, that these two factors are not absolute determinants as to solubility, but another factor, or other factors, which are not known may play a part. Derivatives in which the cellulose aggregates are broken down are always of poorer strength, and lower elasticity, than those that retain to a higher degree the state of polymerization of the native cellulose.

It is an object of this invention to prepare new glycollic derivatives of cellulose by reacting cellulose with an alkali metal salt of a haloacetic acid, which derivatives preferaby retain to a high degree the state of polymerization of the native cellulose. A further object is to so prepare these derivatives that they are readily dissolved in dilute caustic by the mechanism of the step of freezing or almost freezing the solution. A still further object is to prepare useful articles from these derivatives such as films, threads, molded articles, sized fabrics and the like and to improve the usefulness of some of these articles by applying to them a moistureproof coating. Other objects will appear hereinafter.

Briefly, the process consists in treating cellulose with caustic alkali solution and subjecting the resulting alkali cellulose to direct contact with the etherifying agent, that is, the alkali salt of the halo-acetic acid in such proportions and under such conditions that there results a new cellulose glycollic acid of low degree of substitution which retains a high degree of polymerization and which is insoluble or only imperfectly soluble in dilute aqueous solutions of alkalies at ordinary temperatures but soluble in such solutions at low temperatures. The new derivatives are, therefore, readily put into solution, through the mechanism of the step of freezing or almost freezing the solution during the preparation thereof, which solution may thereafter be put into the form of useful products and coagulated in that form.

In order to illustrate the new process the more fully the following examples are given.

Example 1

In an excess of 20% sodium hydroxide solution, one molar weight (162 parts) of oven dried cellulose (spruce sulfite pulp) in the form of sheets is steeped for 2 hours at 28° C. This is pressed out until its weight is three times that of the starting cellulose. The sheets are shredded or torn to crumbs in a shredder of suitable type at a temperature not exceeding 25° C. for 2 hours. The alkali cellulose so prepared is allowed to age or ripen in a covered can for 24 hours at 28° C. before reacting upon it with a solution of 0.6 mol. (70 parts) of sodium chloroacetate in a little water. Such a solution is conveniently prepared by dissolving 56.5 parts of chloroacetic acid in 61 parts of water and neutralizing this with 50 parts of sodium bicarbonate. The reaction can best be carried out in an apparatus of the mixer or shredder type, equipped with a means for circulating warm and cold water through the jacket of the mixer. The sodium chloroacetate solution is kneaded in, and then the shredder is sealed air tight and the contents are warmed to 40–42° C., at which temperature reaction is maintained for 20 hours.

The product, which resembles the original alkali cellulose in appearance and contains approximately 0.1 to .2 glycollic acid residue per glucose unit, is dispersed in 1836 parts of 6% NaOH, in which at room temperature it makes only an imperfect (fibrous) dispersion but which dispersion, after being cooled to −6 to −10° C. and being again warmed to room temperature, is a clear and transparent, colorless or pale straw colored solution of moderate viscosity similar to that of spinning viscose. It is fibre-free but should be filtered to remove any extraneous matter if its application is to be in preparation of threads or films. This solution, after freezing, is stable at 30-35° C. for 3 weeks or more without jelling or undergoing any appreciable change in clarity or in viscosity.

For films the solution is evenly spread upon glass plates to a depth of about 0.1". These are immersed in a coagulating bath (7% $(NH_4)_2SO_4 + 5\%$ $H_2SO_4$ is very suitable) for a period sufficient to ensure thorough coagulation. This is very rapid and 5 minutes is adequate, while much shorter times can safely be used in most cases. The film is removed from its supporting plate and washed acid free. In this stage it may be quite weak and must be handled carefully. It may be softened, using a softener bath, such as glycerine or glycol in aqueous solution. Since the derivative is more readily softened by a small amount of glycerine than is a regenerated cellulose film, a softener bath of not more than 2% glycerine is adequate. The film may then be spread out upon a glass plate and dried at 65° C. for about 20 minutes, and then stripped from the plate.

The finished film is strong, flexible, and soft. The elasticity is surprising. The clarity and luster are unexcelled by that of any regenerated cellulose film. Although when first cast the film is weak and tender, on wetting out after drying it has very good wet strength, quite as high as that of similar cellulose films.

If the film, made as above, is washed free of glycerine and analyzed, it will be found to contain 6.7% $OCH_2COOH$ on the dry basis. This corresponds to one $-O.CH_2COOH$ group per 6.7 $C_6H_{10}O_5$ groups.

*Example 2*

The films prepared as in Example 1 are coated with a composition comprising a synthetic resin and a wax, preferably with the addition of a plasticizer. This can be accomplished according to the teachings of the co-pending application Serial No. 461,840, filed June 17, 1930 by William Hale Charch by using for example:

|  | Parts by weight |
|---|---|
| Polymerization products resulting from 60% vinyl chloride and 40% vinyl acetate | 15 |
| Tricresyl phosphate | 7 |
| Refined paraffin | 3 |

These components are dissolved in 100 to 200 parts of toluene, and the film is coated in any suitable manner such as by immersion. After the excess coating has been removed the solvents are evaporated at an elevated temperature, whereupon a film is produced having at least the same transparency and flexibility of the original base sheet but having in addition the ability to resist penetration of moisture or water vapors.

*Example 3*

The solution of cellulose glycollic acid of spinning viscosity is prepared as in Example 1. This solution is forced through a spinneret containing orifices of about 0.0035 inch diameter, into a coagulating bath consisting of 10% $H_2SO_4$ and 15% $Na_2SO_4$; the filaments that form immediately are combined and the resulting thread is passed over guides in such a way that tension is applied to the thread while it is in the gelled state, and collected upon a bobbin at a speed substantially greater than the jet velocity of the solution at the orifice. It is subsequently washed free from acid, bleached if desired, and dried. As compared with threads regenerated from viscose these require much less bleaching while dyeings with basic dyes reveal substantially increased affinity.

*Example 4*

Textile materials, such as cotton cloth, are dipped into the solution prepared in Example 1, then into a bath of 10% sulfuric acid. After a few minutes in this bath, the cloth is removed, washed acid free and dried. It is found to be markedly stiffened and fulled to an extent considerably greater than any treatment with equivalent alkali and acid solutions would impart. This sizing, distinct from starch sizing, is relatively permanent to laundering.

*Example 5*

One hundred sixty-two parts of oven dry sulfite cellulose pulp boards are steeped in 20% NaOH for 1 hour at 20° C. The pulp boards are removed, pressed to 486 parts by weight, and shredded in a suitable macerating machine for 2 hours at a temperature of 20-22° C. The crumbs of alkali cellulose are aged at 23-25° C. for 48 hours. The alkali cellulose is then put back into the shredder where a solution of ½ molar part (58.25 parts by weight) of sodium chloroacetate in 63 parts of water is added. With continuous mixing the reaction is allowed to proceed for 22 hours at a temperature of 42° C. in the closed kneading machine.

The product containing .1 to .2 glycollic acid residue per glucose unit, is dispersed in 2200 parts by weight of 6% NaOH. The fibrous dispersion is cooled by brine to −12° C. and is then warmed again to room temperature; following this step it is a clear, pale straw colored solution, substantially fiber free, and of medium viscosity. It may be filtered if desired. This solution is very suitable for coagulation in the form of films or filaments.

*Example 6*

Eighty-one grams (½ mol.) oven dry wood pulp treated with 20% NaOH for 1 hour, are pressed to 243 grams and shredded for 2 hours, all at room temperature. This alkali cellulose is aged 24 hours at 20° C. and then caused to react with a solution of ⅛ mol. (14.6 grs.) of sodium chloracetate in 1 mol. (18 grs.) $H_2O$. The reaction is carried out in the shredder at 40° C. over a period of 18 hours. The product containing approximately .075 to 0.15—$OCH_2-CO_2H$ groups per glucose unit, is dispersed in 918 grs. of 6% NaOH. At room temperature there is formed a very incomplete and fibrous dispersion but after freezing at −12 to −14° C. the solution is almost perfect. It may be necessary to filter out a slight residue of insoluble or resistant fibers, but the solution is clear, transparent, very light straw in color, and of high viscosity. As long as this solution is kept below 15-16° C. it retains its fluidity, may readily be filtered and extruded through suitable nozzles for filaments, or spread upon plates to form films. These films are especially strong, being equivalent to regenerated cellulose films on counts of strength, flexibility, clarity, luster, transparency, extensibility and elasticity.

At higher temperatures this solution sets to a jelly very firm and elastic. In this state little can be done with it. Cooling below 10-15° C., however, returns it to its fluid and useful state.

*Example 7*

One hundred sixty-two parts of high alpha content cotton linter cellulose are steeped for an hour at 20° C. in 20% sodium hydroxide solution. The alkali cellulose is then removed, pressed to three times its original weight and put into a shredder through the jacket of which is circulating water at 18° C. The alkali cellulose is shredded for a sufficient period to give thorough comminution and without any further aging it is caused to react with a solution of 58.25 parts (0.5 mol.) of sodium chloroacetate in 63 parts of water. This is mixed in over a period of thirty minutes, after which the shredder is made air tight and the temperature raised to 38° C., at which the reaction mixture is maintained for 20 hours.

The product, containing 0.1 to 0.2 glycollic acid residue per glucose unit and resembling the original alkali cellulose, is dispersed in enough 6% NaOH solution to make a 5% concentration based on the starting cellulose. After stirring at room temperature the dispersion is full of gelled particles and fibers, and is useless. It is cooled to −10° C. at which temperature it is full of ice crystals and would freeze solid if stirring were stopped. The solution is raised to 20° C. at which it remains fluid but very viscous, of beautiful clarity and water white color. Filtration is required to remove a certain small residue of resistant fibers and other extraneous matter. The filtered solution is stable indefinitely at 20° C. From it films of exceptional strength and brilliance can be produced by the method of Example 1.

This solution, when heated above 25° C. sets to a solid jelly which is rigid and elastic. By again cooling below 20° C. the fluidity is returned, the solution being then as useful as ever for the production of threads, films, etc.

As starting materials for the preparation of such low substituted cellulose glycollic acids there may be used cellulose in the form of short fibers such as cotton linters, or wood pulp, in which the state of molecular aggregation is high as evidenced by high or medium viscosities and high alpha cellulose content, i. e., more than 15 seconds viscosity in the standard cuprammonium test and more than 85% alpha cellulose content. The cellulose is preferably dry but need not be bone dry. Air dried cellulose would ordinarily be used.

It has been found that in order to obtain these new derivatives of suitable solubility in dilute alkali solution it is essential to coordinate two factors, namely, the degree of degradation of the cellulose and the degree of substitution of glycollic acid. To obtain solubility suitable to permit desirable concentration and viscosity in the spinning solution, for example, a slight degradation of the cellulose during the preparation of the alkali cellulose is desirable but the treatment in this operation should not be unnecessarily drastic. For some purposes the degradation effected by the alkali cellulose process may be so slight as to leave the cellulose in a substantially undegraded condition. In general, however, this process should effect a slight degradation of the cellulose but, where a high degree of strength and elasticity is required, this is not to be allowed to proceed beyond the degree of degradation which occurs when the alkali cellulose is prepared from purified cotton linters and aged for 48 hours at 25° C. For many purposes e. g., where maximum quality of product is desired, the degree of degradation should not exceed that which occurs when the alkali cellulose is prepared from purified cotton linters and aged for 48 hours at 20° C. In the preferred form of the invention the cellulose is steeped for not more than one hour in an 18-20% solution of caustic alkali at room temperature, or below, and the excess solution is pressed out to leave a moist alkali cellulose which is then shredded to a state of fine crumbs, known to the viscose industry. The concentration of alkali in the steeping caustic may be, however, varied within rather wide limits above 18% though not with much success below this figure unless the steeping temperature is very much below room temperature. Shredding should be carried out at not more than 25° C. and for as short a time as feasible.

The degree of degradation indicated in the above standard is the maximum permissible for high quality of product and it is to be understood that even more desirable products, i. e., products of increased strength and water resistance are made from alkali cellulose of a lower degree of degradation obtainable by operating at lower temperatures or by aging for shorter periods.

Aging of the alkali cellulose should be for as short a time as possible (consistent with the quality of the product desired). The amount of aging required for a given quality of product varies with the nature of the cellulose used, with the amount of etherifying agent to be used and with the purpose for which the solution of the derivative is intended. This aging of the alkali cellulose may sometimes be eliminated but in case of a very resistant cellulose, or in cases where a cellulose glycollic acid solution of high concentration and moderate viscosity is desired, more or less aging is unavoidable. In general, in order to produce useful cellulose glycollic acids which will dissolve in dilute alkalies only on cooling to 0° C., or lower, and which are suitable for the production of film and filaments of high quality, the alkali cellulose aging should not exceed 24 hours at 28° C. or 48 hours at 20° C. For most purposes a shorter period is preferable.

In the etherification reaction, further degradation of the cellulose is controlled by operating under non-oxidizing conditions and by limiting the reaction temperature to not above 50° C. and preferably to around 40-42° C. The degree of substitution is controlled by limiting the proportion of the etherification agent used to a range of from ¼ mol. to ¾ mol. per $C_6$ unit of cellulose and by terminating the reaction promptly when the desired degree of substitution has been effected. This end point is indicated by the solubility test. The etherification reagent may be any one of the alkali metal halo-acetates, preferably sodium chloroacetate and it may be added either dry or in the form of a one normal solution or any other desirable variation. To insure that the desired end point is not past, an end point test has been devised and is described later in this specification. As stated above the amount to be added depends on the product desired and the treatment to which the cellulose has already been subjected, and further it depends upon the nature of the reagent, thus sodium iodoacetate and sodium bromoacetate are more reactive than sodium chloroacetate. In balancing the two controlling factors within the limits of this invention it has been found to be preferable to secure the necessary solubility by a slightly greater degree of substitution while keeping the degradation of the cellulose at a minimum, since this method leads to products which give films, threads, etc., of higher strength and elasticity. The proper stage of etherification at which to terminate the reaction may be determined by removing samples of the reaction mixture from time to time, and placing them in dilute caustic and cooling to freezing. If a few drops of the solution, warmed again to room temperature, are then placed between glass plates and the plates pressed or rubbed against each other, a good product will remain clear, while insoluble fibers will be easily seen in an incompletely reacted product. While, as stated above, it is inadvisable to go above 50° C. the temperature of the reaction may be varied somewhat provided the reaction is stopped when the stage is reached where the solubility test shows the products, while insoluble in alkali at room temperature, are soluble in cold alkali to form a solution stable at room temperature. A positive result from the solution test determines the point at which the degree of substitution is favorably coordinated with the degree of degradation of the alkali cellulose used as a raw material. It will be understood that wherever, throughout the specification and claims, the expression "reacting" is used, reacting to the point where the above test is positive is meant. In all the steps of the process care is taken to avoid unnecessary depolymerization by using low temperature, cold water or brine circulating in the shredder during the shredding step, exclusion of air wherever practicable, etc.

In the preparation of certain of the useful articles mentioned above the etherification product containing approximately 0.075 to 0.35 glycollic acid residue per glucose unit is mixed with about 16 times its weight of a 6–10% sodium hydroxide solution and cooled below 0° C. or to the solubility point. In many cases lower concentrations of caustic, e. g., 4%, may be used with advantage, especially where the solution is to be used for purposes other than spinning, for example, for sizing, impregnating, etc.

When it is desirable to isolate the cellulose glycollic acid, the product obtained by the etherification may be washed out with a large excess of water, keeping the sodium hydroxide content of the washing below 1%, and then dried, but such products have a tendency to dry to a horny condition difficult to dissolve. This difficulty may be overcome to some extent by washing with methanol and then with ether before drying. But it is, in general, unnecessary to isolate this product, since for spinning it is preferable to dissolve the etherification product directly in dilute alkali, adjusting the concentration to the desired viscosity.

In preparing the solutions, temperatures from 5° C. down to the freezing point are satisfactory. The temperature to which the mixture must be cooled to effect solution is to some extent dependent on the degree of substitution of the derivative. The lower the degree of substitution the lower the temperature required to effect complete dispersion. The solution so obtained may be brought back to room temperature and filtered if desired. It may be used directly for treatment of textiles or paper, or it may be put into the desired form and coagulated by a suitable bath. While the solutions that have been described are not indefinitely stable at room temperatures they may be kept for as long as three weeks without jelling. High temperatures accelerate the jelling, but after jelling has taken place the material may be rendered fluid again by chilling. The re-chilled solution is, however, not stable for as long a time at room temperature as the original solution. It may be that the stability of these solutions at room temperature or above is a phenomenon of hysteresis.

In the process used to form fibers or threads, considerable variation is possible in the composition of the coagulating bath. Water may in some cases be used, but is usually not satisfactory. Solutions of mineral acids such as sulfuric, ranging from low concentrations, such as 3–4%, to 70% or higher are suitable. These may with benefit be combined with salt solutions, as 5–15% $Na_2SO_4$ or $(NH_4)_2SO_4$, and also with buffers and sugars such as is common practice in the viscose industry. The problem of coagulation is thus very similar to that of viscose, but is not complicated by the necessity for regeneration and there is contamination only with the salt and water of the solution. Absence of sulfur compounds also diminishes the need for bleaching.

In the preparation of transparent sheets by the process of this invention the sheets may be softened by such softeners as glycerol, diethylene glycol and the like. The amount of softener required is somewhat less than that required for regenerated cellulose films and the unsoftened film is more flexible than an unsoftened regenerated cellulose film.

The process described in Example 1 for preparing transparent sheets is one suited to laboratory technique. Instead of coagulating the film on a glass plate, the solution may be forced continuously through a narrow slit into a coagulation bath and thereafter passed over rolls, through suitable baths, etc., in the manner known to the industry. In this case and more particularly in Example 3, which concerns the formation of threads and is not adapted to laboratory technique, continuous mechanical processes have not been described since the invention is not concerned with these and since they are well known to the art.

It has also been found that the transparent sheets mentioned above may be rendered moistureproof. In addition to the method described in Example 2 they may be treated according to the process described in Church and Prindle U. S. Patent 1,737,187 for the moistureproofing of sheets of regenerated cellulose. A satisfactory composition for this purpose contains 43 parts cellulose nitrate, 23 parts tricresyl phosphate, 7 parts paraffin wax, 27 parts gum damar, and 760 parts of a mixed solvent containing about 3 parts ethyl acetate to 2 parts toluene. After passing sheets of cellulose glycollic acid made as in Example 1 through the above composition the excess lacquer was removed from the sheets by means of a squeeze roll and the sheets were dried at a temperature substantially above the melting point of the wax.

The moistureproofed sheets were glass clear, flexible, and were highly impermeable to the passage of moisture vapor, comparing very favorably in this respect with films of regenerated cellulose which had been moistureproofed by the same composition. However, when the adhesion of the moistureproofed coating was tested by suspension in water, it was found to be distinctly superior to the adhesion of a similar coating on a sheet of regenerated cellulose. Thus with the regenerated cellulose separation between the sheet and coating occurred in from one to three hours but with the cellulose glycollic acid sheet prepared as in Example 1 and waterproofed as above, separation occurred only after 24 hours' treatment.

Still another method of treatment comprising using the composition given below which is disclosed in a copending application, Serial No. 582,488, filed Dec. 21, 1931, by William R. Straughn:

| | Parts |
|---|---|
| Candelilla wax | 33 |
| Paraffin (melting point 62° C.) | 16 |
| Zinc resinate | 5 |
| Toluene | 500 to 1000 |

The solution is applied in any convenient manner, the excess removed and the solvent evaporated at an elevated temperature. The resulting coated film is glass clear in transparency, flexible and distinctly moistureproof.

These new low substituted products differ from those of the prior art in that the degree of substitution is approximately from .075 to .35 glycollic acid residue per unit of cellulose. They are distinguished further in that they are insoluble, or at least imperfectly soluble in dilute aqueous caustic alkali at normal temperatures but become soluble in such alkali solution when the solution is chilled to near its freezing point.

These new derivatives are superior to the previously described cellulose glycollic acids soluble in dilute alkalies at room temperatures in that they are less hygroscopic and less sensitive to water in general. Transparent sheets made from them have a higher wet strength, and may, therefore, be handled more easily during manufacture and are less susceptible to damage in such processes as the finished goods must undergo. These films are superior to regenerated cellulose in having a greater flexibility and softness, and moreover they have a marked affinity both for basic and for direct dyestuffs.

Other advantages have been stated or are apparent in the specifications and examples.

It is obvious that many apparent and widely different embodiments of this invention may be made without departing from the spirit thereof and the invention is not intended to be limited except as indicated in the appended claims.

What is claimed is:

1. As a new product, cellulose glycollic acid containing from .075 to .35 glycollic acid residue per $C_6$ unit of cellulose, said product being substantially insoluble in 6% aqueous caustic soda solution at ordinary temperatures but soluble in said alkali solution near the freezing point thereof.

2. The process of preparing solutions of the product described in claim 1 which comprises mixing the said product with an aqueous solution of sodium hydroxide, chilling below 0° C. and agitating until a clear solution is effected.

3. The process of preparing solutions of the product described in claim 1 which comprises mixing the said product with an aqueous solution of sodium hydroxide, chilling below —5° C. and agitating until a clear solution is effected.

4. The process of preparing solutions of the product described in claim 1 which comprises mixing the said product with an aqueous solution of sodium hydroxide, chilling to and agitating at the freezing point of the alkaline solution until a clear solution is effected.

5. Process for preparing the product of claim 1, which comprises treating alkali cellulose degraded, but not beyond the stage obtained by aging alkali cellulose for 48 hours at 25° C., with an alkali metal haloacetate, under non-oxidizing conditions, until the product while insoluble in 6% caustic soda at ordinary temperatures is soluble therein near the freezing point thereof and contains from .075 to .35 glycollic acid residue per $C_6$ unit of the cellulose, and stopping the etherification.

6. A solution in dilute caustic soda of the product of claim 1.

7. Process which comprises reacting shortfibered cellulose with an alkali metal haloacetate in the presence of aqueous caustic alkali solution and continuing the reaction until the product, while insoluble in dilute aqueous caustic alkali at room temperature, is soluble therein at temperatures below 0° C., and thereupon discontinuing the reaction.

8. Process which comprises reacting alkali cellulose with an alkali metal haloacetate and continuing the reaction until the product, while insoluble in dilute aqueous caustic alkali at room temperature, is soluble therein at temperatures below 0° C., and thereupon discontinuing the reaction.

9. Process of preparing low substituted cellulose glycollic acid substantially insoluble in dilute caustic alkali solution at ordinary temperatures, but soluble in said alkali solution near the freezing point thereof, which process comprises preparing alkali cellulose by treating cellulose with caustic alkali solution, pressing off the excess alkali solution, shredding the alkali cellulose, reacting the alkali cellulose with alkali metal haloacetate, continuing the reaction until the product, while insoluble in dilute aqueous caustic alkali at room temperature, is soluble therein at temperatures below 0° C., and thereupon discontinuing the reaction.

10. Process of preparing low substituted cellulose glycollic acid substantially insoluble in dilute caustic alkali solution at ordinary temperatures, but soluble in said alkali solution near the freezing point thereof, which process comprises preparing alkali cellulose by treating cellulose with caustic alkali solution at a temperature not substantially above 25° C., reacting the alkali cellulose with alkali metal haloacetate in quantity up to about ¾ mol. per $C_6$ unit of the cellulose at a temperature not substantially above 50° C., continuing the reaction until a product is obtained which can be dissolved below 0° C., in dilute caustic alkali solution to form a solution stable at room temperature and thereupon discontinuing the reaction.

11. As a new product, low substituted cellulose glycollic acid substantially insoluble in dilute aqueous caustic alkali solution at room temperature but soluble in said alkali solution near the freezing point thereof.

12. Process which comprises reacting shortfibered cellulose with an alkali metal haloacetate in the presence of aqueous caustic alkali solution and continuing the reaction until the product, while insoluble in dilute aqueous caustic soda at room temperature, is soluble therein at temperatures below 0° C., and thereupon discontinuing the reaction.

13. Process which comprises reacting alkali cellulose with an alkali metal haloacetate and continuing the reaction until the product, while insoluble in dilute aqueous caustic soda at room temperature, is soluble therein at temperatures below 0° C., and thereupon discontinuing the reaction.

14. Process of preparing low substituted cellulose glycollic acid substantially insoluble in dilute caustic soda solution at ordinary temperatures, but soluble in said alkali solution near the freezing point thereof, which process comprises preparing alkali cellulose by treating cellulose with caustic alkali solution, pressing off the excess alkali solution, shredding the alkali cellulose, reacting the alkali cellulose with alkali metal haloacetate, continuing the reaction until the product, while insoluble in dilute aqueous caustic soda at room temperature, is soluble therein at temperatures below 0° C., and thereupon discontinuing the reaction.

15. Process of preparing low substituted cellulose glycollic acid substantially insoluble in dilute caustic soda solution at ordinary temperatures, but soluble in said alkali solution near the freezing point thereof, which process comprises preparing alkali cellulose by treating cellulose with caustic alkali solution at a temperature not substantially above 25° C., reacting the alkali cellulose with alkali metal haloacetate in quantity up to about ¾ mol. per $C_6$ unit of the cellulose at a temperature not substantially above 50° C., continuing the reaction until a product is obtained which can be dissolved below 0° C., in dilute caustic soda solution to form a solution stable at room temperature and thereupon discontinuing the reaction.

16. As a new product, low substituted cellulose glycollic acid substantially insoluble in dilute aqueous caustic soda solution at room temperature but soluble in said alkali solution near the freezing point thereof.

JOSEPH F. HASKINS,
*Administrator of Deane C. Ellsworth, Deceased.*